United States Patent
Lowe

(10) Patent No.: US 12,512,022 B2
(45) Date of Patent: Dec. 30, 2025

(54) KIT FOR STORING AND DISPLAYING A STRING OF CHARACTERS

(71) Applicant: Arculus Holdings L.L.C., Somerset, NJ (US)

(72) Inventor: Adam Lowe, Somerset, NJ (US)

(73) Assignee: Arculus Holdings, L.L.C., Somerset, NJ (US)

( * ) Notice: Subject to any disclaimer, the term of this patent is extended or adjusted under 35 U.S.C. 154(b) by 171 days.

(21) Appl. No.: 18/017,214

(22) PCT Filed: Jul. 20, 2021

(86) PCT No.: PCT/US2021/042294
§ 371 (c)(1),
(2) Date: Jan. 20, 2023

(87) PCT Pub. No.: WO2022/020299
PCT Pub. Date: Jan. 27, 2022

(65) Prior Publication Data
US 2023/0274671 A1    Aug. 31, 2023

Related U.S. Application Data

(60) Provisional application No. 63/154,267, filed on Feb. 26, 2021, provisional application No. 63/055,009, filed on Jul. 22, 2020.

(51) Int. Cl.
G09F 9/302     (2006.01)
G09F 11/23     (2006.01)

(52) U.S. Cl.
CPC .............. *G09F 11/23* (2013.01); *G09F 9/302* (2013.01)

(58) Field of Classification Search
CPC ....... G09F 11/23; G09F 9/302; G06Q 20/065; H04L 9/50; H04L 9/0897; H04L 9/3239;
(Continued)

(56) References Cited

U.S. PATENT DOCUMENTS 591,146 A    10/1897    Stannard
754,724 A    3/1904    Van Putten
(Continued)

FOREIGN PATENT DOCUMENTS

FR    2510418 A  *  2/1983  ............ A63F 9/0811
KR    20100092326 A    8/2010
(Continued)

OTHER PUBLICATIONS

1pc Vintage Cylinder Gift Box, With Password Lock, Secure Storage For Wedding Rings,https://www.temu.com/ul/kuiper/un9.html?subj=goods-un&_bg_fs=1&_p_jump_id=894&_xvst_scene=adg&goods_id=601099520533999&sku_id=17592233453942&adg_ctx=a-f629fe83-c-70b86a44-f-41edcc4f&, © 2024 WhaleCo Inc., (Year: 2024).

(Continued)

*Primary Examiner* — Cassandra Davis
(74) *Attorney, Agent, or Firm* — Buchanan Ingersoll & Rooney

(57) ABSTRACT

A kit for storing a string of characters, and method for using the kit, such as for storing a cryptocurrency seed phrase. The kit includes at least one rod having a length and a non-round cross-sectional geometry, a plurality of disks each having a hole defining a non-round geometry dimensioned to receive the rod in a plurality of orientations, and a mechanism for securing a selected subset of the disks on the rod. A plurality of characters are visibly disposed on the outer periphery of each disk such that when mounted on the rod, a selected one of the characters is non-rotatably oriented facing a predetermined radial direction. The kit may include a rack for holding multiple rods.

23 Claims, 16 Drawing Sheets

(58) Field of Classification Search
CPC .............................. A63F 9/0811; A63F 9/083; A63F 2009/0815; G09B 1/18; G09B 1/20; G09B 1/22

See application file for complete search history.

(56) References Cited

U.S. PATENT DOCUMENTS

| | | | |
|---|---|---|---|
| 2,282,852 A * | 5/1942 | Chann | 40/503 |
| D238,751 S | 2/1976 | MacGrossen et al. | |
| D257,047 S | 9/1980 | Stenersen | |
| D259,081 S | 5/1981 | Sharpless, Jr. et al. | |
| D272,292 S | 1/1984 | Campbell | |
| D273,093 S | 3/1984 | Lundén et al. | |
| 4,632,399 A | 12/1986 | Bern | |
| 4,902,230 A | 2/1990 | Jones | |
| 4,974,848 A | 12/1990 | Gieseker | |
| D330,512 S | 10/1992 | Ryberg | |
| D330,818 S | 11/1992 | Brandt | |
| D376,691 S | 12/1996 | Naas et al. | |
| D464,217 S | 10/2002 | Clarke et al. | |
| D464,218 S | 10/2002 | Clarke et al. | |
| 6,550,165 B2 * | 4/2003 | Chirafesi, Jr. | G09D 3/08 40/107 |
| D670,858 S | 11/2012 | Fakhouri et al. | |
| D710,456 S | 8/2014 | Berkshire | |
| D734,037 S | 7/2015 | Coon | |
| 9,489,859 B2 | 11/2016 | Paulovich | |
| 10,127,830 B2 | 11/2018 | Ballew | |
| D972,392 S | 12/2022 | Luo | |
| D979,176 S | 2/2023 | Wang | |
| D979,177 S | 2/2023 | Wang | |
| D987,224 S | 5/2023 | Yang | |
| 2005/0278186 A1 | 12/2005 | de la Huerga | |
| 2006/0213241 A1 | 9/2006 | Swanson | |
| 2009/0081625 A1 * | 3/2009 | Baerg | G09B 1/14 434/209 |

FOREIGN PATENT DOCUMENTS

| | | | |
|---|---|---|---|
| KR | 20120017863 A * | 2/2012 | |
| WO | 8203563 A1 | 10/1982 | |
| WO | WO-2023247979 A1 * | 12/2023 | |

OTHER PUBLICATIONS

Office Action (Restriction for Requirement) issued by the U.S. Patent and Trademark Office in the Design U.S. Appl. No. 29/772,117, mailed Feb. 20, 2024, U.S. Patent and Trademark Office, Alexandria, VA. (17 pages).

BitHD Frozen Armor Review, Oct. 19, 2020, downloaded from the internet, https://jlopp.github.io/metal-bitcoin-storage-reviews/reviews/bithd-frozen-armor/, Mar. 2, 2021, 5 pages.

Bitkee Review, May 4, 2020, downloaded from the internet, https://jlopp.github.io/metal-bitcoin-storage-reviews/reviews/bitkee/, Mar. 2, 2021, 3 pages.

Blockplate Review, May 28, 2020, downloaded from the internet, https://jlopp.github.io/metal-bitcoin-storage-reviews/reviews/blockplate/, Mar. 2, 2021, 5 pages.

Crytposteel Capsule Duo, downloaded from the internet, https://cryptosteel.com/product/cryptosteel-capsule/?v=79cba1185463, Jul. 6, 2020, 3 pages.

Cryptoetch Review, Sep. 29, 2020, downloaded from the internet, https://jlopp.github.io/metal-bitcoin-storage-reviews/reviews/cryptotech/, Mar. 2, 2021, 4 pages.

Hodlinox Single Plate Review, Sep. 29, 2020, downloaded from the internet, https://jlopp.github.io/metal-bitcoin-storage-reviews/reviews/hodlinex-single/, Mar. 2, 2021, 8 pages.

International Search Report and Written Opinion for International Application No. PCT/US2021/042294, dated Nov. 3, 2021, 10 pages.

Metal Bitcoin Seed Storage Reviews, May 27, 2020, downloaded from the internet, https://jlopp.github.io/metal-bitcoin-storage-reviews/, Mar. 2, 2021, 3 pages.

SAFU Ninja Review, Sep. 29, 2020, downloaded from the internet, https://jlopp.github.io/metal-bitcoin-storage-reviews/reviews/safu-ninja/, Mar. 2, 2021, 3 pages.

Seedplate Review, Sep. 29, 2020, downloaded from the internet, https://jlopp.github.io/metal-bitcoin-storage-reviews/reviews/seedplate/, Mar. 2, 2021, 4 pages.

SeedSteel Review, Oct. 19, 2020, downloaded from the internet, https://jlopp.github.io/metal-bitcoin-storage-reviews/reviews/seedsteel/, Mar. 2, 2021, 6 pages.

SteelKi Review, Sep. 29, 2020, downloaded from the internet, https://jlopp.github.io/metal-bitcoin-storage-reviews/reviews/steelki/, Mar. 2, 2021, 5 pages.

Tjernlund CC3P Review, Sep. 29, 2020, downloaded from the internet, https://jlopp.github.io/metal-bitcoin-storage-reviews/reviews/tjernlund-cc3p/, Mar. 2, 2021, 4 pages.

Anonymous, "Puzzle PodTM", www.puzzlepod.com, saved Apr. 18, 2019, retrieved from the internet, https://web.archive.org/web/20190418013541if_/http://puzzle-pod.com/wp-content/uploads/2016/10/instruction_sheet_puzzle_podr2.pdf, 9 pages.

* cited by examiner

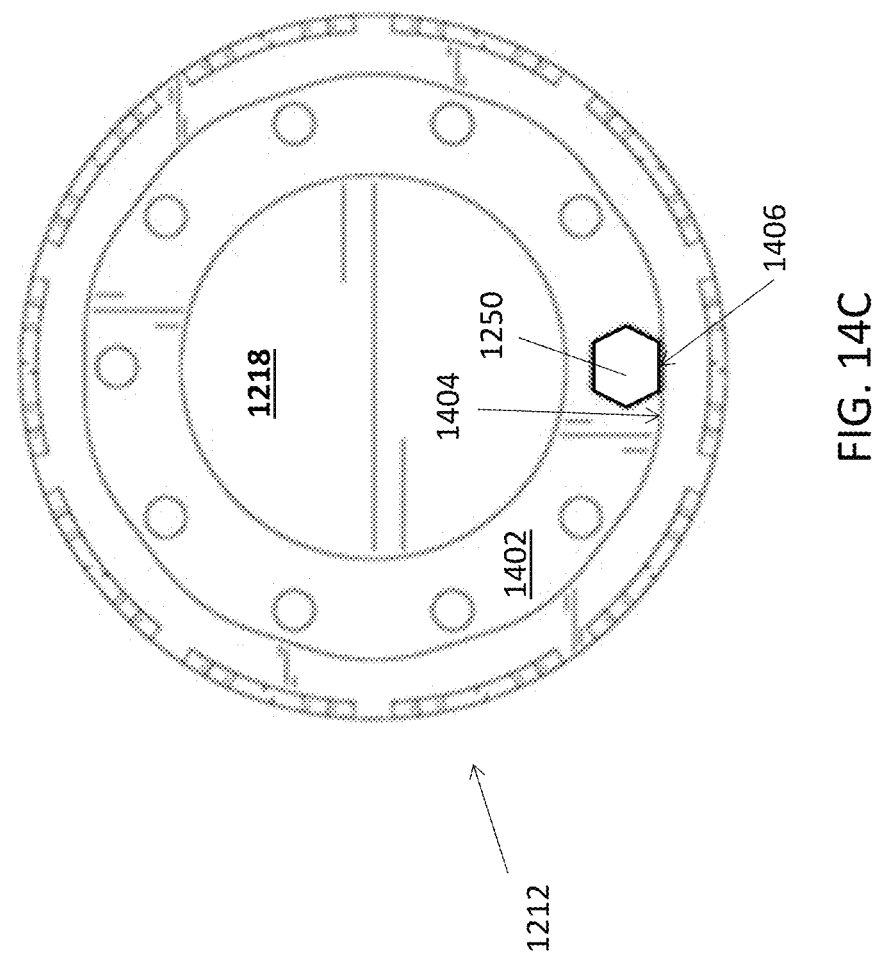

KIT FOR STORING AND DISPLAYING A STRING OF CHARACTERS

CROSS-REFERENCE TO RELATED APPLICATIONS

This Application is a U.S. National Phase Patent Application of PCT Patent Application No. PCT/US2021/042294, filed Jul. 20, 2021, which is related to, and claims the benefits of priority of U.S. Provisional Application Nos. 63/055,009, filed 22 Jul. 2020, and 63/154,267, filed 26 Feb. 2021, both entitled KIT FOR STORING AND DISPLAYING A STRING OF CHARACTERS, the contents of each of which are incorporated herein by reference in their entireties for all purposes.

BACKGROUND OF THE INVENTION

In the field of cryptocurrency (such as Bitcoin, etc.), a private key (the unique, typically alphanumeric, code that allows the currency to be spent) is typically saved in a wallet file, where it is kept secret. Private keys are typically retrievable from a wallet using a seed phrase that is essentially a complex password comprised of multiple (e.g. 12 or 24) words. The seed phrase is essentially the equivalent of a bearer bond or cash or jewels—the bearer is in possession of all the value corresponding to the cryptocurrency, so this information needs to be kept safe and secure. Loss of the seed phrase risks loss of the entire value of the currency. Committing the phrase to memory risks forgetting it or loss upon death or disability of the memorizer. Storage of the seed phrase on a computer connected to the internet risks discovery by hacking. Accordingly, seed phrases are often kept in "cold storage"—a storage media unconnected to the Internet. While some cold storage may include a flash drive or a piece of paper, the risk of inadvertent disabling of a flash drive or destruction of paper over time, have caused cryptocurrency owners to seek other, more indestructible ways to save seed phrases. Accordingly, there remains a need in the art for safe and creative ways of storing information in the form of characters, including but not limited to seed phrases, in a way that has permanence and compactness.

SUMMARY OF THE INVENTION

One aspect of the invention comprises a kit for storing a string of characters. The kit comprises at least one rod having a length and a non-round cross-sectional geometry and a plurality of disks, each disk having a hole defining a non-round geometry dimensioned to receive the at least one rod, and means for securing a selected subset of one or more of the plurality of disks on the at least one rod. Each disk has an outer periphery and a plurality of characters visibly disposed on the outer periphery in each of a number of predetermined positions. Each disk is configured to receive the at least one rod in a plurality of orientations in which a selected one of the characters is non-rotatably oriented facing a predetermined radial direction. In embodiments, each disk may have a circular outer periphery or may have a plurality of peripheral outer faces in which each peripheral outer face contains one of the plurality of characters. Each of the visibly disposed characters may be embossed or debossed relative to at least an adjacent portion of the outer periphery of the disk. The visibly disposed characters may comprise alphanumeric characters and blank space characters, and in some embodiments may consist of only alphabetical characters and blank space characters.

The plurality of disks may comprise a first plurality of disks each having a different character in each of the plurality of predetermined positions. In some embodiments, a second plurality of spacer disks may have only blank space characters in each predetermined position. In some embodiments, at least some of the first plurality of disks includes a blank space character in one of the predetermined positions. In some embodiments, the number of predetermined positions on each disk may be in a range of three to eight.

Embodiments include those in which the non-round cross-section comprises a polygon, such as a geometrically regular polygon or a non-regular polygon, a star shape, or a circular base shape with a one or more rotation-preventing features, such as radial projections, radial indents, or chamfers. The cross-sectional geometry of the rod and the geometry of the holes in the disks may be geometrically similar. In embodiments in which the cross-sectional geometry of the rod defines a first number of rotation-preventing features, the geometry of the holes in each disk define a second number of mating rotation-preventing features, wherein the first number and the second number are the same or different.

The rod and the disks may comprise metal, such as aluminum, tungsten, or steel, such as stainless steel, and/or a ceramic material, such as a ceramic coating over metal, or a reinforced ceramic material.

The length of the at least one rod may be suitable, and the plurality of disks sufficient in number and in character variety, to permit an assembly of disks on the at least one rod to spell one or more words or word fragments, each word or word fragment comprising a plurality of characters. In some embodiments, the assembly of disks on the rod may store at least two of the one or more words or word fragments, with a space between each pair of adjacent words or word fragments. In some embodiments, the at least one rod may be configured to hold a sufficient number of disks to spell five to twenty-five of the one or more words or word fragments.

In other embodiments, the at least one rod may comprise a plurality of rods. The kit may further comprise a rack for receiving a plurality of rods, each with the assembly of disks mounted thereon. The rack may be configured to hold a number of rods sufficient to collectively display five to twenty-five of the one or more words or word fragments. Some or all of the one or more words or word fragments correspond to words selected from a set of seed phrase words that define a cryptocurrency wordlist, such as a BIP39 standard wordlist or any wordlist wherein each word in the wordlist is uniquely identifiable by a corresponding word fragment having fewer than the corresponding plurality of letters. All but one portion of the one or more words or word fragments may comprise or correspond to words selected from a set of seed phrase words that define the cryptocurrency wordlist.

Another aspect of the invention is a method of displaying a string of characters, the method comprising the steps of providing a kit as described herein, assembling selected disks on the at least one rod to form the string of characters. Displaying the string of characters may comprise a memorialization of a security code, such as a security code comprising a plurality of words or word fragments in sequence, wherein the method includes assembling the selected disks on the rod to spell the plurality of words or word fragments in the security code with a space between each pair of adjacent words or word fragments. In a method using a kit having a rack for holding a plurality of rods, the method further including securing the plurality of rods on the rack. Some or all of the plurality of words or word fragments in the security code may comprise or correspond to words selected from a set of seed phrase words corresponding to a cryptocurrency wordlist, such as a BIP39 standard wordlist. All but one portion of the security code may comprise words or word fragments corresponding to words selected from the set of seed phrase words, wherein the one portion not comprising or corresponding to the words selected from the set of seed phrase words may comprise a password.

BRIEF DESCRIPTION OF THE DRAWINGS

FIG. 14C is a plan view of the inner surface of the unassembled end cap of FIG. 14B, further showing placement of one of the hexagonal rods.

DETAILED DESCRIPTION OF THE INVENTION

Figure 1:
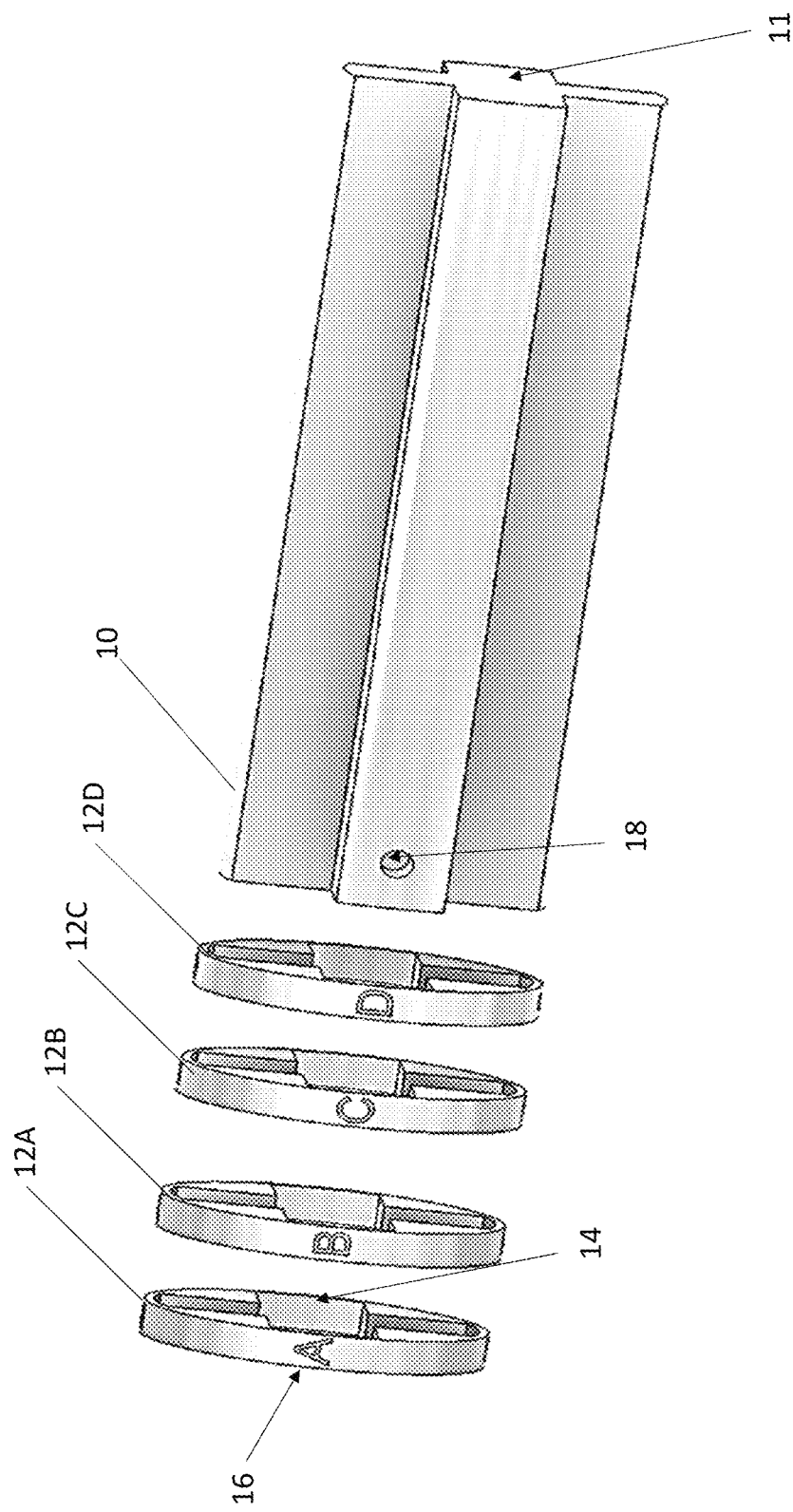
FIG. 1 depicts an exemplary portion of a first exemplary kit comprising disks and a rod for physically displaying a string of characters.

Referring now to the figures, an exemplary kit for storing a string of characters is shown. A rod 10 having a length and a non-round cross-section 11 is configured to receive a plurality of disks 12. Each disk has a non-round hole 14 having a geometry dimensioned to receive the rod. A plurality of characters 16 are readably disposed on the outer periphery of each disk in each of a number of predetermined positions. Each disk configured to receive the rod in a plurality of orientations in which a selected one of the characters is non-rotatably oriented facing a predetermined radial direction. The plurality of disks may be secured on the rod with a securing member, such as a set screw (not shown) that fits in a corresponding hole 18 and protrudes sufficiently to prevent the disks from sliding off the respective ends.

In the alternative, the set screw may be used in conjunction with a specific end disk (not shown) designed to be fastened in place by the set screw and having a diameter sufficient to restrict sliding of the other disks. In another embodiment, a spring-loaded protruding detent (not shown) may be disposed in hole 18, such that the detent is configured to be radially compressed (or pulled radially inward by an internal mechanism) flush with the shaft to permit the disk to slide past it, with a spring biasing the detent back into a protruding configuration once the compression or other radially inward force is released. Although shown in one location, set screws or such detents may be located on multiple orientations around the shaft. The invention is not limited to any particular type of mechanism for preventing disks secured on a rod from sliding off or otherwise decoupling from the rod, and may therefore include any such means known in the art. For example, each rod may instead be configured to receive an end cap (not shown) having a cross sectional dimension sufficient to prevent the disks from decoupling from the rod (i.e. having periphery extending radially further than the cross-sectional area of the rod in at least one portion thereof such that it does not permit the hole in the disk to longitudinally pass). The end cap may have a periphery identical to the periphery of the disks, or may be smaller or larger radially. Such configurations may include the rod having a hole tapped with female threads to receive a male threaded member, with end caps coupled to or otherwise fastened to the rod by the threaded member. Other configurations may include the rod having male threaded ends, and end caps with female threads configured to screw onto the rods. Notably, one end of each rod may be configured to receive the disks to slide onto the rod, and the other end of the rod may have an integral end portion having a periphery as described above to essentially form an end cap that is monolithically formed as part of the rod to keeps disks from sliding off that end of the rod. The integral end portion may comprise a tapered end that tapers from a geometry suitable for the corresponding holes in the disk to pass to a geometry that prevents further passage, including a geometrically similar geometry of sufficiently greater cross-sectional area. Notably, although referred to as an end "cap," the term cap as used herein refers to any device of any geometry sufficient to prevent passage of the disks, and is not limited to geometries that cover the ends of the rods. The cap may include geometries that comprise disks, concave or convex shapes, as well as linear shapes defining one or more lines of sufficient geometry to block the disks from sliding past.

As depicted in FIG. 1, the cross section 11 of the rod 10 and the corresponding periphery of the hole 14 in the disk both have a polygonal shapes (a cross-shaped dodecagon, as depicted in FIG. 1), that facilitates placement of each disk 12 on the rod 10 in one of four orientations. As depicted, four disks 12A, 12B, 12C, 12D are shown, each with a different respective letter—A, B, C, D—in the orientation depicted. Disks 12A, 12B, 12C, 12D as depicted may represent identical disks (each with the letters A, B, C, D in different positions) in respective first, second, third, and fourth orientations, or may represent four different disks, with other letters or other characters positioned to face the viewer in respective second, third, and fourth orientations of each disk.

Although depicted with letters of the alphabet, the characters may comprise any type of character or symbol, but preferably alphanumeric characters and punctuation characters. As used herein, the term "character" refers to any visible depiction provided on the disk, including alphanumeric symbols, non-alphanumeric symbols, punctuation symbols, and blank spaces. A full kit may comprise enough disks to include multiples of all of the letters of the alphabet, all numbers 0-9, and at least blank space characters. At least some of the disks may have a different alphanumeric or punctuation characters in each predetermined position on the periphery of the disk. In some embodiments, some disks (i.e. spacer disks) may have only spaces in all of the predetermined position, including embodiments comprising disks with no visually perceptible disruptions in the disk periphery in the character positions (which disk peripheries may be identical or different than the peripheries of character containing disks) and disks in which a visibly defined blank space is formed relative to the non-character periphery of the disk in each character position. In other embodiments, at least some disks may include a blank space (or lack of a defined visually perceptible character) in one of the predetermined positions, with different defined characters in the other predetermined positions. As used herein, unless expressly defined otherwise, the term "blank space character" refers to both embodiments comprising the lack of a defined character and embodiments comprising a discretely defined blank space.

Although depicted with a rod/disk geometry in FIG. 1 that provides for 4 predetermined orientations (and thus 4 predetermined positions for characters on each disk), the number of predetermined positions on each disk may be have any number, but preferably in a range of three to eight. Exemplary embodiments are depicted in FIGS. 2-7 with having respective rods 210, 310, 410, 510, 610, 710 and corresponding disks 212, 312, 412, 51, 612, 712 having corresponding holes 214, 314, 414, 514, 614, 714 for mating with the rods to provide characters 216, 316, 416, 516, 616, 716 at three, four, five, six, seven, and eight different orientations, respectively. As depicted in FIGS. 2-7, each rod has a polygonal cross-section and each disk has a hole with a polygonal geometry, but the invention is not limited to rods and holes with polygonal geometries. Although each polygon is depicted in FIGS. 2-7 as a geometrically regular polygon, the use of polygonal geometries is not limited to geometrically regular polygons. As expressly shown in FIG. 1, the polygonal geometry of the rod cross section and mating hole may comprise a non-regular polygon, including a non-regular polygon in which the number of vertices (as well as the number of faces) exceeds the number of character positions on the disks.

Figure 2:
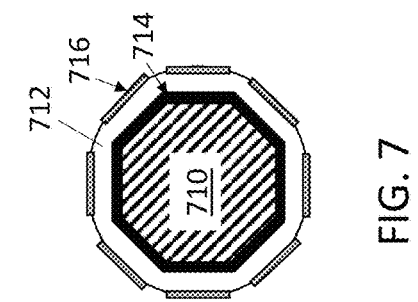
FIG. 2 depicts an exemplary cross-sectional view of a rod having a triangular cross section and a mating hole with a triangular geometry.
Figure 3:
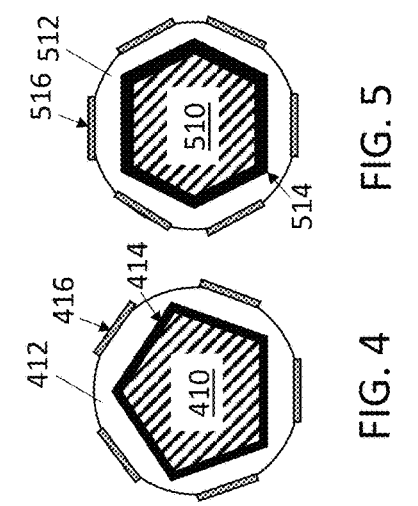
FIG. 3 depicts an exemplary cross-sectional view of a rod having a square cross section and a mating hole with a square geometry.
Figure 4:
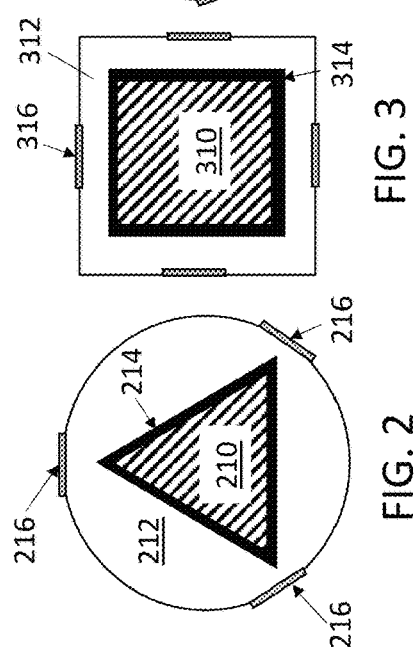
FIG. 4 depicts an exemplary cross-sectional view of a rod having a pentagonal cross section and a mating hole with a pentagonal geometry.
Figure 5:
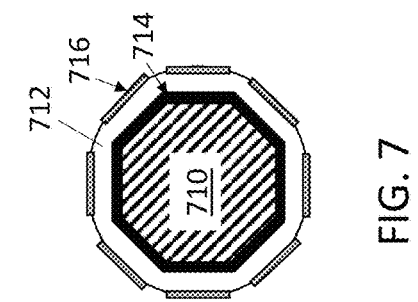
FIG. 5 depicts an exemplary cross-sectional view of a rod having a hexagonal cross section and a mating hole with a hexagonal geometry.
Figure 6:
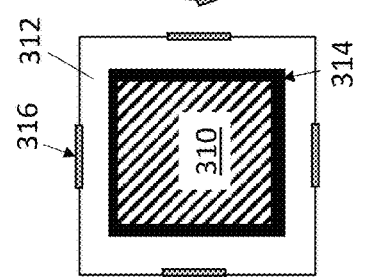
FIG. 6 depicts an exemplary cross-sectional view of a rod having a heptagonal cross section and a mating hole with a heptagonal geometry.
Figure 7:
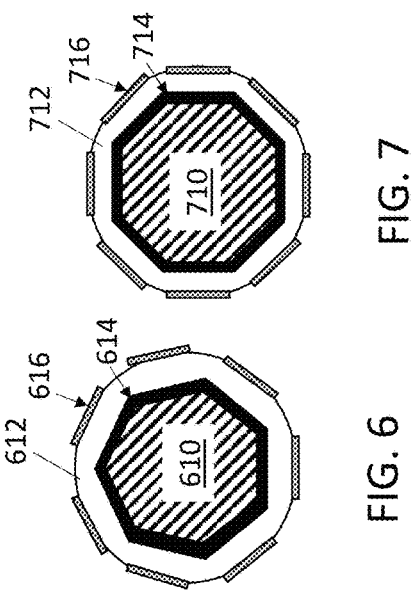
FIG. 7 depicts an exemplary cross-sectional view of a rod having an octagonal cross section and a mating hole with an octagonal geometry.

The rod cross section and the hole in each disk may be geometrically similar (such as but not limited to geometrically similar polygons), wherein the hole in the disk is slightly larger than the cross-section of the rod to permit easy assembly of the respective disks on the respective rods. This size difference may be exaggerated in FIGS. 2-7, which are not to scale. Notably, the term "disk" as used herein is not intended to convey any particular geometry of the outer periphery of the disk. For example, the disk may have a circular periphery as depicted in many of the figures, or the disk may have an outer periphery that is polygonal, including but not limited to a polygonal periphery that is geometrically similar to the cross-section of the rod and the geometry of the mating hole, such as the square disk as depicted in FIG. 3. Hybrid geometries comprising generally circular peripheries truncated to have planar faces corresponding to each character orientation may also be provided.

The orientation of the character relative to the cross-section of the hole in the disk is not limited to any particular orientation. For example, as depicted in FIG. 2, the characters 216 are positioned in alignment with the vertices of the triangular cross-section, but in FIG. 3, the characters 316 are positioned in alignment with the faces of the square cross-section. Embodiments in which the characters are not aligned with the vertices or the faces may also be provided. Each character location is depicted herein only schematically as a rectangular shape generally aligned with the periphery of the disk, but it should be understood that the characters are preferably debossed (e.g. radially inset) or embossed (radially protruding or otherwise formed in relief relative to a surrounding floor) relative to the non-character periphery of the disk, such as the engraved characters depicted in FIGS. 1 and 11. Embossed characters, for example, may be formed by creating a floor area surrounding the letter at predetermined depth below the non-character periphery of the disk such that the letter stands in relief relative to the floor. Methods for creating the embossed or debossed letter may including, without limitation, engraving, milling, etching, molding, or stamping processes.

Figure 8:
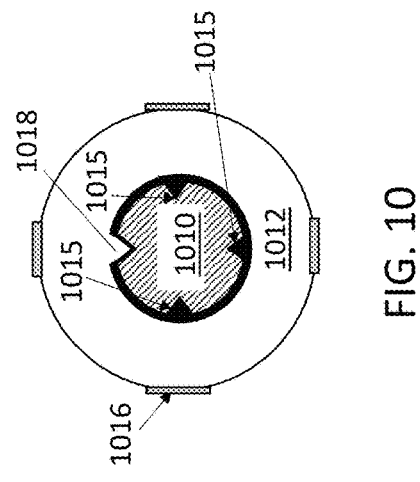
FIG. 8 depicts an exemplary disk having an octagonal hole mounted on a rod with a rectangular cross section.

Embodiments in which the cross-section of the rod and the hole have different geometries may also be provided, so long as the disk has a desired plurality of different orientations on the rod. For example, as depicted in FIG. 8, disk 812 has a hole 814 with an octagonal geometry dimensioned to fit on rod 810 having a rectangular cross section, providing a total of eight characters 816 at corresponding orientations. Disks having holes with a hexagonal geometry may be similarly configured to fit on a rod with a square or rectangular cross section. Likewise, disks with pentagonal or heptagonal hole geometries may be designed to fit on corresponding rods having triangular cross sections of appropriate dimensions. Preferably, however, the cross-section of the rod and the geometry of the hole are geometrically similar for ease of sliding the disks onto the rods.

Figure 9:
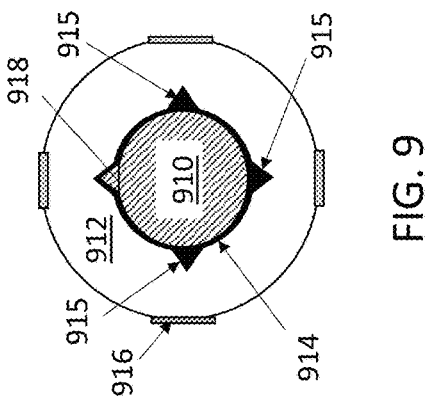
FIG. 9 depicts an exemplary rod having a circular base geometry with a singular protrusion, and a mating disk with a hole having a mating circular base geometry with four mating indents.
Figure 10:
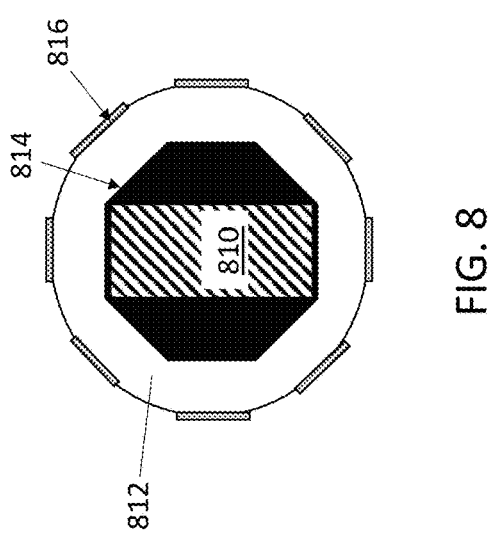
FIG. 10 depicts an exemplary rod having a circular base geometry with a four indents, and a mating disk with a hole having a mating circular base geometry with a single mating indent.

In other embodiments, the non-round cross section of the rod may comprise a circular base shape with one or more radial projections, chamfers or indents. The non-round cross-section of the rod may be geometrically similar to the cross section of the hole in each disk (i.e. the hole in the disk may have the same number of mating projections, indents, or chamfers), or the hole and the disk may have different numbers of projections, chamfers, or indents, so long as the total number of orientations of each disk on the rod correspond to the number of characters on the periphery of the disks. For example, as depicted in FIG. 9, rod 910 has a generally circular geometry with a single radial projection 918 (depicted as having a triangular cross-section, but the projection is not limited to any particular geometry). The hole 914 in mating disk 912 has four radial indents 915 configured to receive the projection in each of the four desired orientations. Notably, rods with two, three, or four projections positioned to receive the indents would also be functional with the disk as depicted. In the embodiment depicted in FIG. 10, disk 1012 has only a single radial projection 1018 into the generally circular hole 1014, and rod 1010 has a plurality of mating indentations (although variations may have 2, 3, or 4 such indentations would also be functional). Thus, the embodiments depicted in FIGS. 9 and 10 may be generally characterized by the non-round cross-section of the rod having a first number of rotation-preventing features and the non-round cross section of each disk having a second number of mating rotation-preventing features different than the first number, such that fewer than all of the rotation-preventing features of the disk are engaged with the rod (FIG. 9) or fewer than all of the rotation-preventing features of the rod are engaged with the disk (FIG. 10), when the disk is mounted on the rod.

In all of the embodiments as described herein, the rod and the disks comprise a material that is fireproof (and otherwise resistant to damage at elevated temperatures), waterproof, and impact-resistant. In some embodiments, the disks may comprise metal, preferably a metal selected from the group consisting of: aluminum, steel, tungsten, titanium, without limitation to any particular material. In other embodiments, the disks may comprise a ceramic material, such as a reinforced ceramic, such as a Ceramic Matrix Composite (CMC) comprising ceramic fibers in a ceramic matrix, including fibers or matrices comprising carbon, silicon carbide (SiC), alumina (Al2O3) and mullite (Al2O3-SiO2), without limitation. Ultra-high Temperature Ceramic Matrix Composites (UHTCMC) or Ultra-high Temperature Ceramic Composites (UHTCC) may be particularly useful. In still other embodiments, the disks may comprise ceramic-coated metal. Although not limited to any particular size, the length of the rod is suitable and the plurality of disks are sufficient in number and character variety to permit an assembly of disks on the rod to spell one or more words, or identifying portions thereof, such as words from a predetermined wordlist, each word comprising a plurality of characters. In preferred embodiments, the words comprise words from a cryptocurrency seed phrase wordlist, such as is accordance with the BIP39 mnemonic phrase standard known in the art, incorporated herein by reference. More preferably, the length of the rod is suitable and the plurality of disks are sufficient in number and character variety to permit an assembly of disks on the rod to store at least two of the one or more words, with a space between each pair of adjacent words. Most preferably, each rod may be configured to hold a sufficient number of disks to spell 5 to 25 of the one or more words. As is known in the field, in some cryptocurrency systems, the words are unique enough that only a subset of the letters in the word (e.g. the first four letters) are required to identify the word, in which case the rod may only need to be long enough to receive disks sufficient for the first four letters of each word of the number of words in the seed phrase (and, optionally, an additional unique password not taken from the wordlist). In still other embodiments, the owner may wish to store one or more "false" words that only the user knows is not one of the genuine seed words, for additional security. Thus, the rods may be long enough to house more than the number of disks to spell the actual number of words in the seed phrase.

Figure 11:
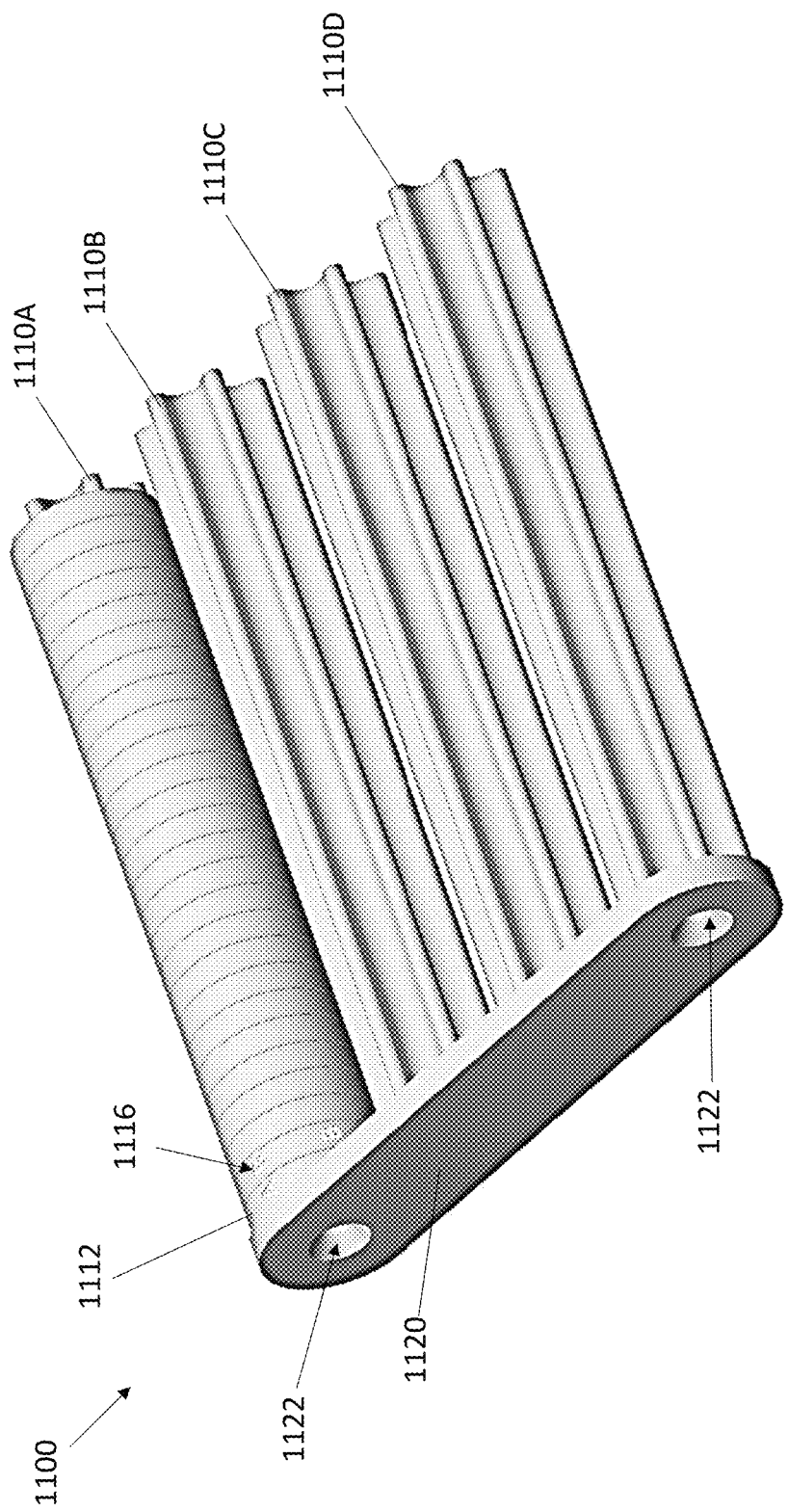
FIG. 11 depicts an exemplary rack for storing a plurality of exemplary rods, each with a star-shaped cross-sectional geometry.

FIG. 11 depicts a rack 1100 for receiving a plurality of rods 1110A, 1110B, 1110C, 1110D, each configured to receive an assembly of disks 1112 mounted thereon (although disks are shown only on rod 1110A to reduce clutter in the figure). The rack is preferably configured to hold a number of rods sufficient to collectively display 5 to 25 of the one or more words. As depicted, each rod 1110A, 1110B, 1110C, 1110D has a 6-pointed star-shaped geometry with generally rounded points connected to one another by rounded valleys. It should be noted that star-shaped geometries are not limited to 6-point stars, and may comprise stars having any number of points, which points may be rounded or acute, particularly stars with anywhere from three to eight points that provide for three to eight corresponding character positions. Although depicted as sized to receive 26 disks each, the rods may be any size, and the rack may be designed to hold fewer or more than 3 rods. One or more side rails 1120 (shown only on one side, but in a final assembly, may be present on both ends of the rods) have a profile inset (e.g. such as by milling) into them to match the cross-section of the rods, so that the rods fit within the insets and do not rotate. Each rod (or at least rods 1110A and 1110D) has a tapped hole (not shown) in each end configured to receive a threaded fastener through each of holes 1122 in side rail 1120 that secures the rods and the rails together. The side rails serve as the means for securing the disks on the rod. In embodiments comprising only a single side rail, the side rail may secure the disks to one end of the rod, and the opposite end of the rod may include an end cap or integral end portion having a periphery that extends radially further than the cross-sectional area of the rod in at least one portion, as described above.

It should also be understood that kits with a plurality of rods may also be provided without racks. Kits without racks wherein which each rod holds fewer than all of the rods needed to form a secure code, such as a cryptocurrency seed phrase, may be sequentially numbered, or may come with numbered disks to enable a user to indicate the sequence of rods corresponding to the sequence of stored characters corresponding to the code.

Thus, the kit as depicted and described herein may be used in a method of displaying a string of characters. The method comprises the steps of providing the kit as described, and assembling selected disks on the rod to form the string of characters. As described, displaying the string of characters may comprises a memorialization of a secure code comprising a plurality of words in sequence, in which the method comprises assembling the selected disks on the rod to spell the plurality of words in the secure code, preferably with a space between each pair of adjacent words. In a kit that comprises a rack for holding a plurality of rods, the method includes securing the plurality of rods on the rack, such as to form a seed phrase from a cryptocurrency wordlist. The method may further include displaying within the string of characters a password not selected from the cryptocurrency wordlist.

It should be understood that the kits as provided to a user may have extra security features, such as providing a random number more of each type of disk than are needed to completely create all of the possible seed phrases. For example, in a system with four orientations for each disk, the collection of disks may include disks of the different types shown below:

Disk 1: A, B, C, D
Disk 2: E, F, G, H
Disk 3: I, J, K, L
Disk 4: M, N, O, P
Disk 5: Q, R, S, T
Disk 7: U, V, W, X
Disk 8: Y, Z, 1, 2
Disk 9: 3, 4, 5, 6
Disk 10: 7, 8, 9, 0
Disk 11: [Spaces]

In a system in which being able to spell each possible combination of 60 words on the wordlist might require 60 of each disk, the kit may have a random number more of each disk than the minimum amount (e.g. five extra of Disk 2; eleven extra of Disk 5, etc.) to increase security. Otherwise, for example, creating each kit with exactly the same number of disks would provide useful information to someone finding a kit of disks remaining after assembly of the seed phrase, which might facilitate easier reverse engineering of the seed phrase.

Another exemplary embodiment 1200 is depicted in FIGS. 12A-19D. Like the embodiments described above, one use for the device is for securely and permanently storing a user's 24-word secret passphrase in a destruction-proof manner, while also minimizing the size of the device and providing an aesthetically pleasing form factor. The device also allows the user to set up the passphrase in private to avoid disclosure to others. This embodiment includes ten hexagonal rods 1250, onto which letter disks 1240 are slidably mounted in the correct order and orientation to create the passphrase. The ten hexagonal rods or standoffs are radially distributed about central longitudinal axis A.

The letter disks 1240 each have a central hexagonal hole 1246 which allows the user to index each block into 1 of 6 positions, wherein each position exposes a different face with a different letter 1242 to the outside of the device. The kit comprises five unique letter blocks, each of which has 5 or 6 letter characters marked into the 6 faces, wherein those with only 5 letters have a blank space character in the sixth position. For example, disk 1240 depicted in FIG. 13A-F has 6 letters A, B, C, D, E, F. Other disks, not shown, may contain only 5 letters and a blank space characters each (e.g. G, H, I, J, K, [space]; L, M, N, O, P, [space]; Q, R, S, T, U, [space]; V, W, X, Y, Z, [space]). In other configurations, a more popular letter found in the set of passcode words may be duplicated on one or more of the disks, instead of space.

The invention is not limited to any particular combinations of letters and blank spaces on the respective disks.

Figure 12A:
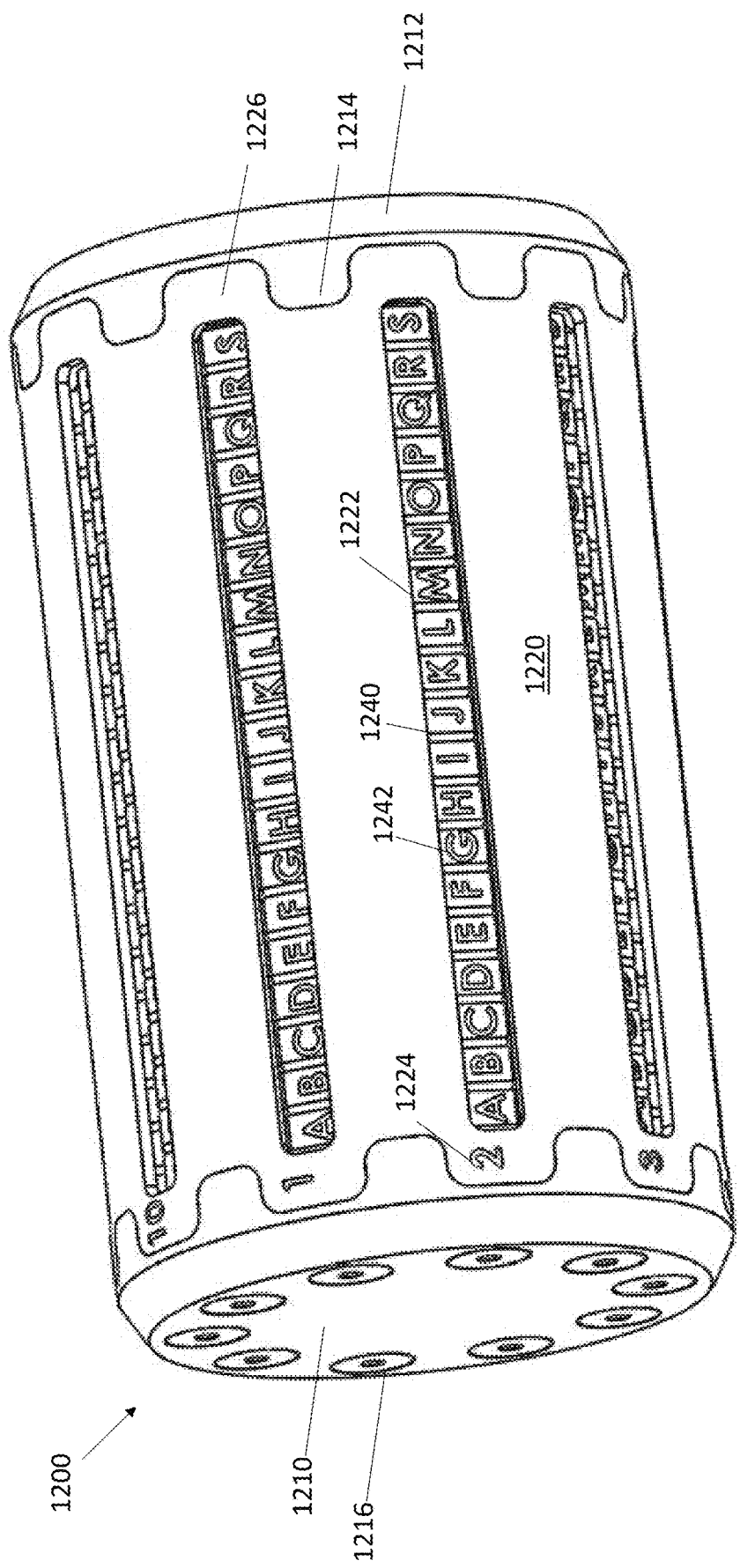
FIG. 12A is a left, front, top isometric view schematic drawing of a second exemplary kit in an assembled configuration showing a left end cap with visible heads of a plurality of left side bolts, a protective shroud with a plurality of disks visible through each of a plurality of longitudinal windows in the protective shroud, and a right end cap.
Figure 12B:
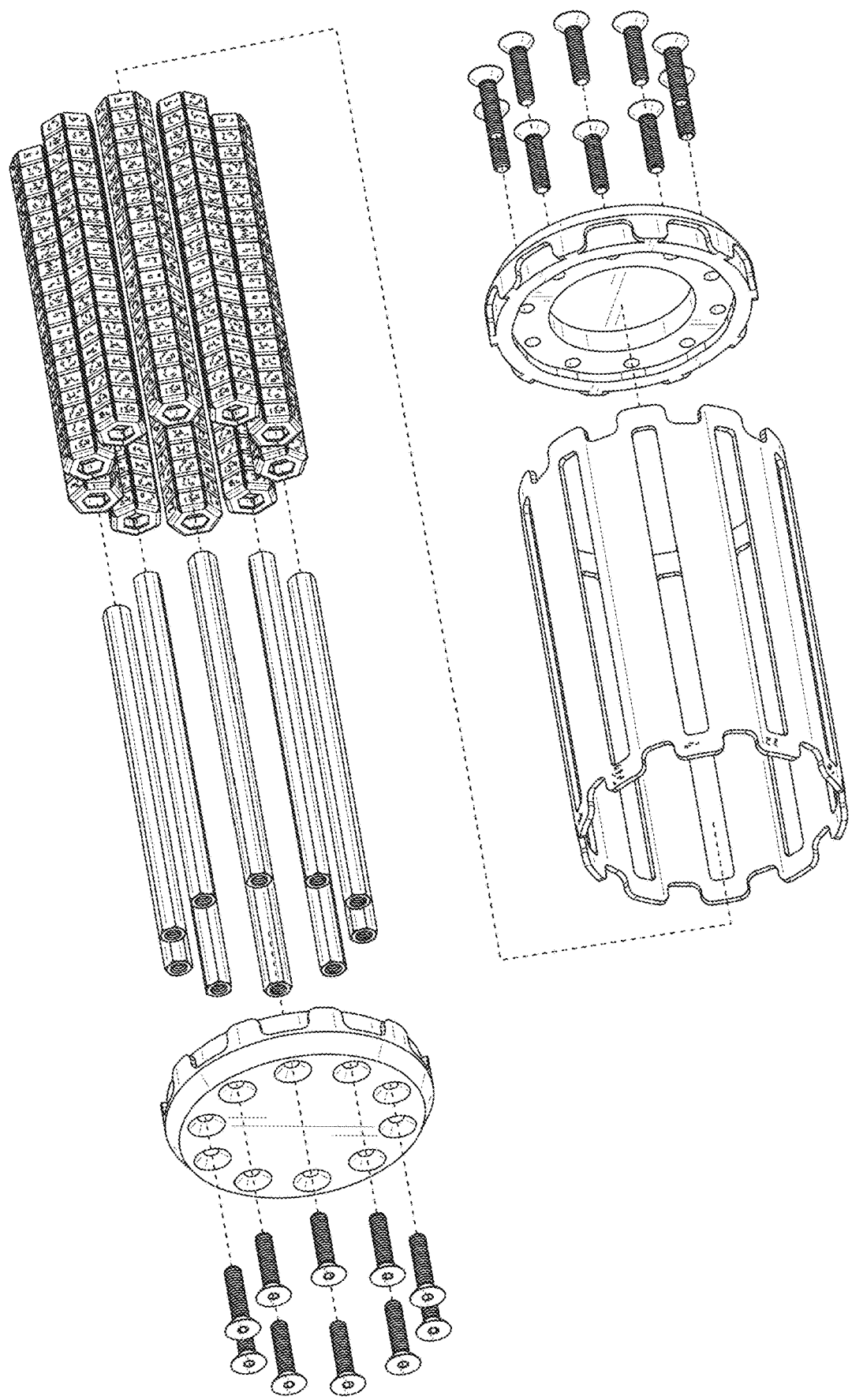
FIG. 12B is a left, front, top isometric view schematic drawing of the kit of FIG. 12A in an exploded configuration showing from left to right, the intended assembly of the left side bolts, the left end cap, a plurality of internal hexagonal cross-section rods, the plurality of disks, the protective shroud, the right end cap, and right side bolts.
Figure 12C:
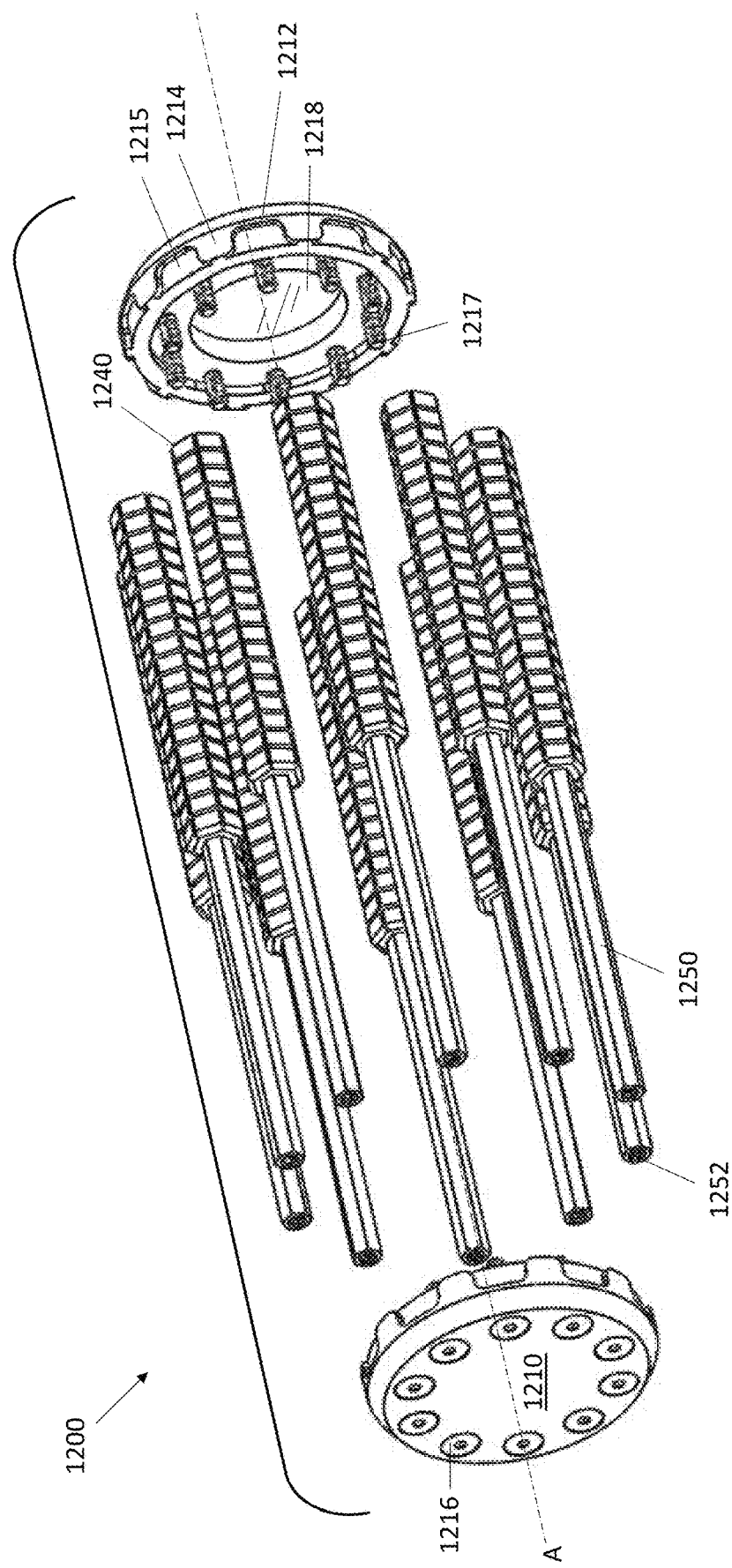
FIG. 12C is a left, front, top isometric view schematic drawing of the kit of FIG. 12A in a partially assembled configuration.
Figure 13B:
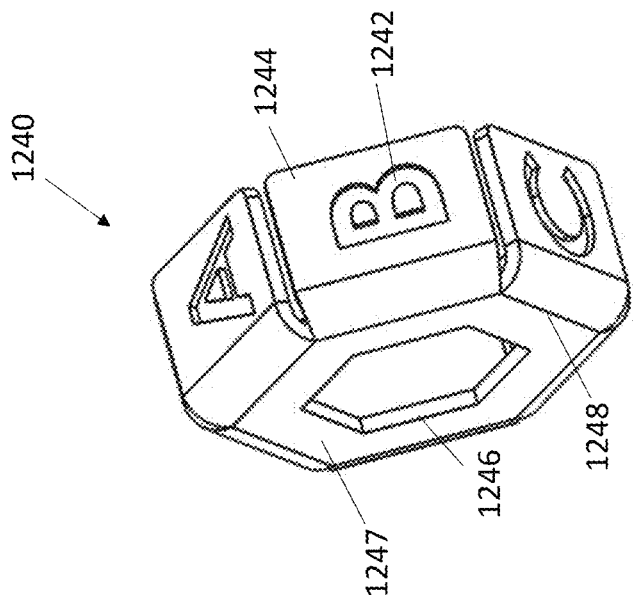
FIG. 13B is a left, front, top isometric view schematic drawing of the disk of FIG. 13A, shown in a folded configuration.
Figure 13A:
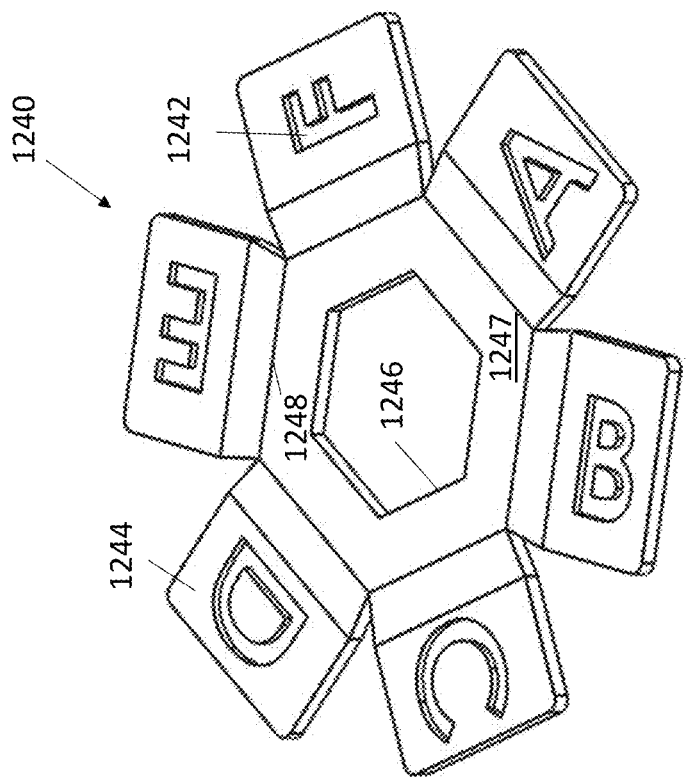
FIG. 13A is a left, front, top isometric view schematic drawing of a disk featured in the kit of FIGS. 12B and 12C, shown in a flat, unfolded configuration.
Figure 13D:
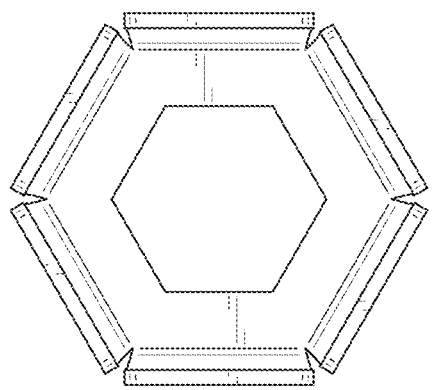
FIG. 13D is a plan view of the disk of FIG. 13B viewed from the right side in the orientation depicted in FIG. 13B.
Figure 13C:
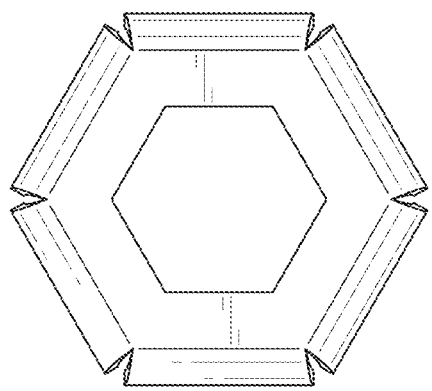
FIG. 13C is a plan view of the disk of FIG. 13B viewed from the left side in the orientation depicted in FIG. 4.
Figure 13E:
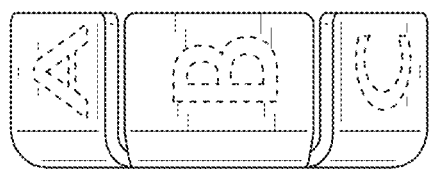
FIG. 13E is a front side plan view of the disk of FIG. 13B.
Figure 13F:
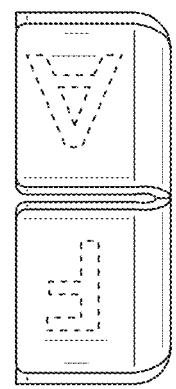
FIG. 13F is a top side plan view of the disk of FIG. 13B viewed from a top of the orientation shown in FIG. 13E.
Figure 14A:
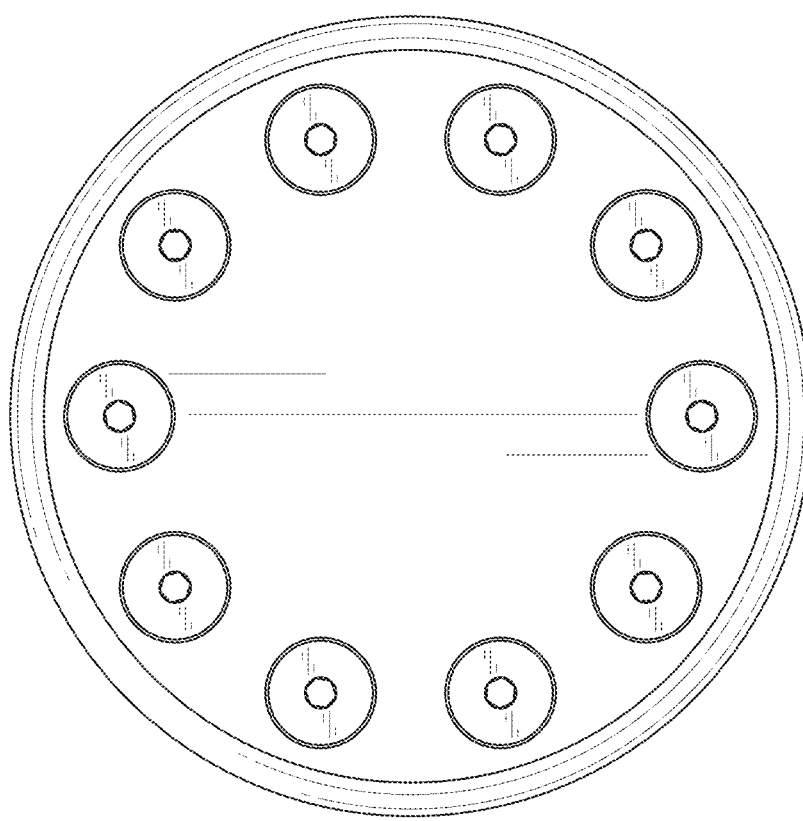
FIG. 14A is a plan view of the outer side of one of the unassembled end caps of the kit depicted in FIGS. 12A-12C, viewed from the left in the orientation depicted in FIG. 12B, showing holes for receiving corresponding heads of the bolts.
Figure 14B:
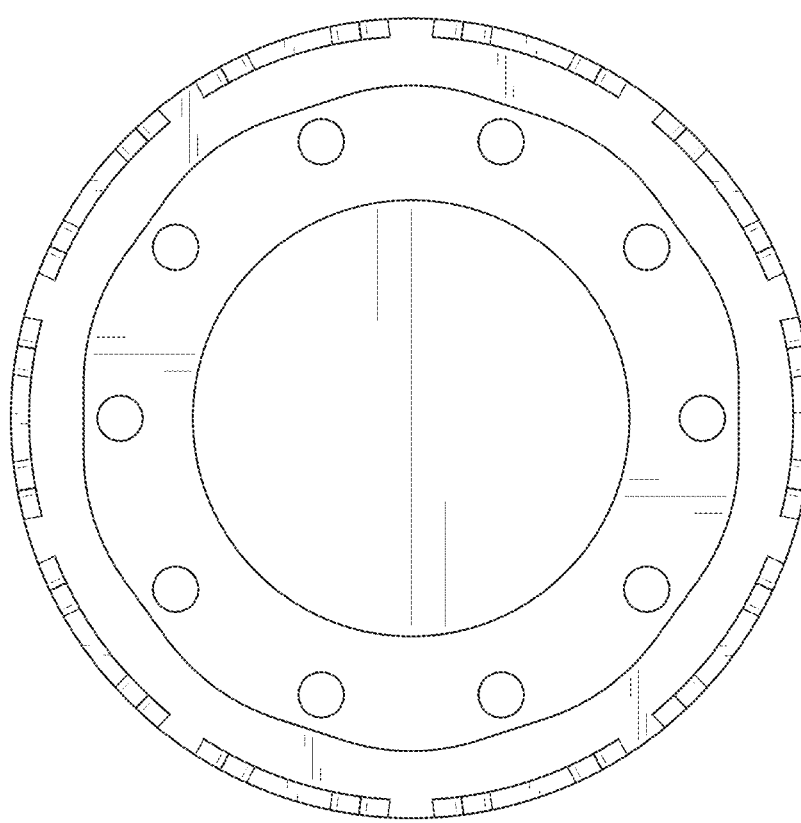
FIG. 14B is a plan view of the inner surface of the unassembled end cap of FIG. 14A, viewed from the right in the orientation depicted in FIG. 12B, showing holes for receiving corresponding shafts of the bolts.
Figure 15A:
FIG. 15A is a left end plan view of one of the internal hexagonal rods depicted in FIGS. 12B and 12C.
Figure 15B:
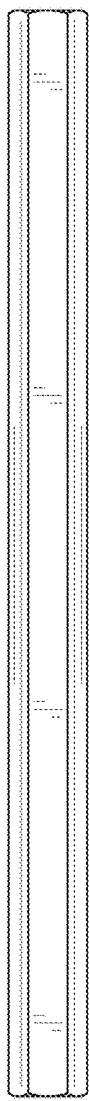
FIG. 15B is a front side plan view of the rod of FIG. 15A, viewed from the right in the orientation depicted in FIG. 15A, and which is identical to the back side plan view of the rod viewed from the left in the orientation depicted in FIG. 15A.
Figure 15C:
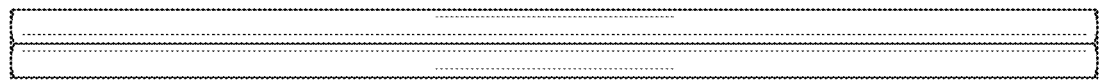
FIG. 15C is a top side plan view of the rod, viewed from the top in the orientation depicted in FIG. 15A, and which is identical to the bottom side plan view of the rod viewed from the bottom in the orientation depicted in FIG. 15A.
Figure 15D:
FIG. 15D is a right end plan view of the rod of FIG. 15B, viewed from the right in the orientation depicted in FIG. 15B.
Figure 16C:
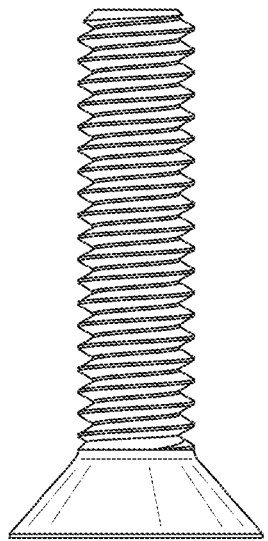
FIG. 16C is a side plan view of the bolt of FIG. 16A, viewed from the right in the orientation depicted in FIG. 16A, and a 90-degree clockwise rotated view of a top plan view of the bolt viewed from the top in the orientation depicted in FIG. 16A.
Figure 16D:
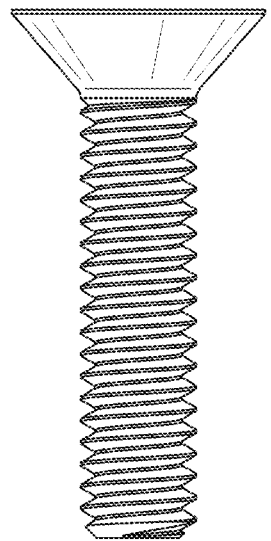
FIG. 16D is a side plan view of the bolt of FIG. 16A, viewed from the right in the orientation depicted in FIG. 16B, and a 90-degree counter-clockwise rotated view of a bottom plan view of the bolt viewed from the bottom in the orientation depicted in FIG. 16C.
Figure 16A:
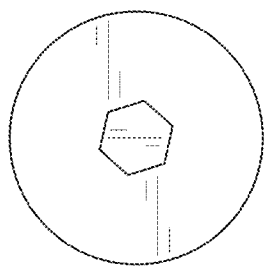
FIG. 16A is a plan view of a head end of an exemplary bolt.
Figure 16B:
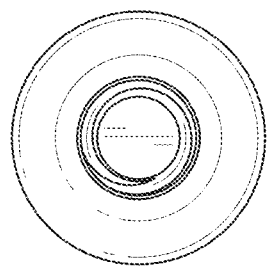
FIG. 16B is a plan view of a tail end of the bolt of FIG. 16A.
Figure 17C:
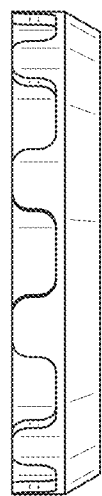
FIG. 17C is a top side plan view of the left end cap, viewed from the top of the orientation depicted in FIG. 17A, and which is a mirror image reflected on a horizontal plane of the bottom plan view of the left end cap viewed from the bottom of the orientation depicted in FIG. 17A.
Figure 17D:
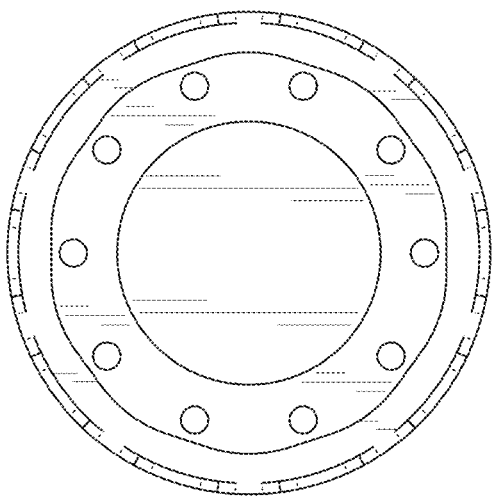
FIG. 17D is an end plan view of the inner side of the left end cap, viewed from the right in the orientation depicted in FIG. 17B and the top in the orientation depicted in FIG. 17C.
Figure 17B:
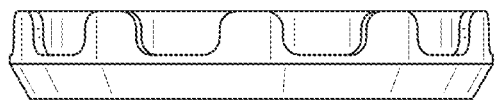
FIG. 17B is a right side plan view of the left end cap, viewed from the right of the orientation depicted in FIG. 17A, and which is a mirror image reflected on a vertical plane of the left side plan view of the left end cap viewed from the left of the orientation depicted in FIG. 17A.
Figure 17A:
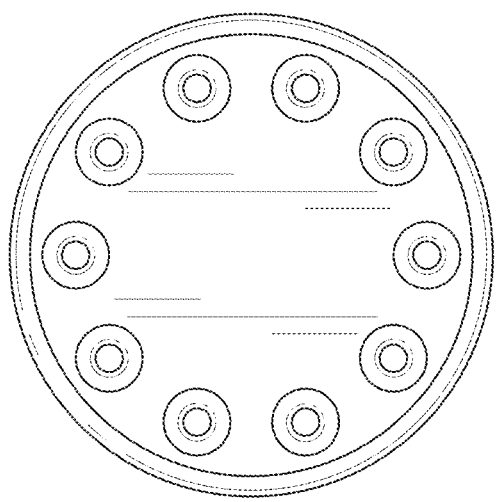
FIG. 17A is an end plan view of an outer side of the left end cap, viewed from the left end in the orientation depicted in FIG. 12B, showing holes for receiving corresponding heads of the left side bolts.
Figure 18C:
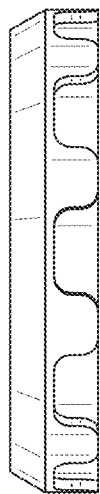
FIG. 18C is a top side plan view of the right end cap, viewed from the top of the orientation depicted in FIG. 18A, and a mirror image reflected on a horizontal plane of the bottom side plan view of the right end cap viewed from the bottom of the orientation depicted in FIG. 18A.
Figure 18D:
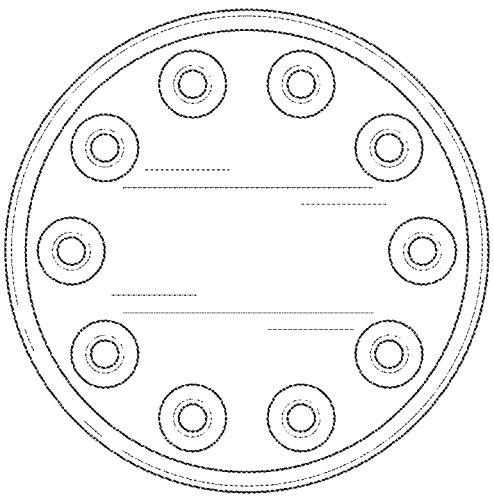
FIG. 18D is an end plan view of the outer side of the right end cap, viewed from the right in the orientation depicted in FIG. 18B and the top in the orientation depicted in FIG. 18C.
Figure 18B:
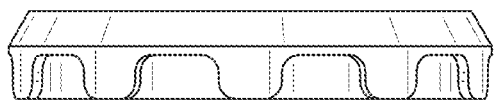
FIG. 18B is a right side plan view of the right end cap, viewed from the right of the orientation depicted in FIG. 18A, and a mirror image reflected on a vertical plane of the left side plan view of the right end cap viewed from the left of the orientation depicted in FIG. 18A.
Figure 18A:
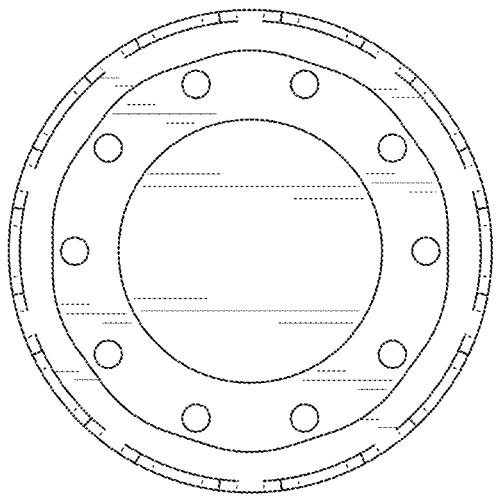
FIG. 18A is an end plan view of an inner side of the right end cap, viewed from the left end in the orientation depicted in FIG. 12B, showing holes for receiving corresponding shafts of the right side bolts.
Figure 19B:
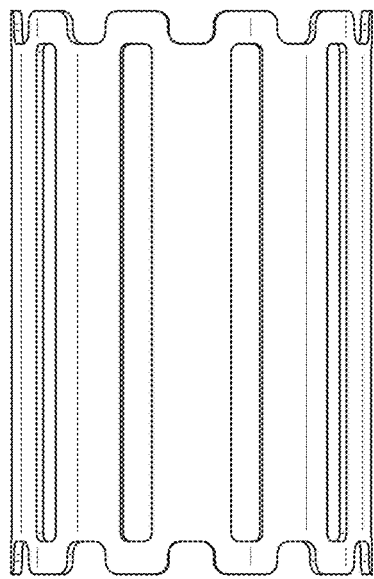
FIG. 19B is a front side view of the shroud, viewed from the right in the orientation shown in FIG. 19A, and identical to the back side view of the shroud viewed from the left in the orientation shown in FIG. 19A.
Figure 19D:
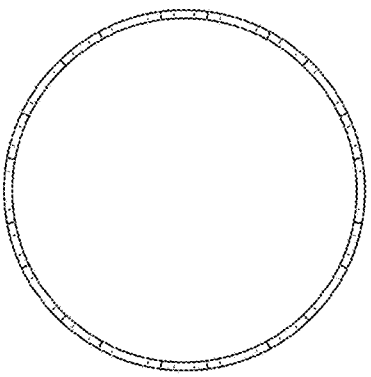
FIG. 19D is a right end view of the shroud, viewed from the right in the orientation shown in FIG. 19C.
Figure 19A:
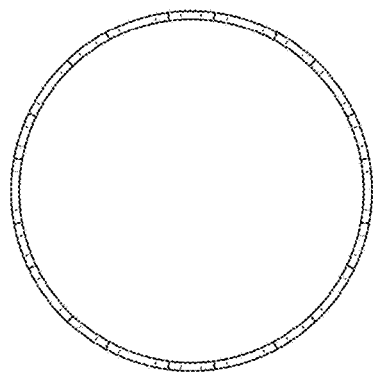
FIG. 19A is a left end view of the shroud, viewed from the left in the orientation shown in FIG. 12B.
Figure 19C:
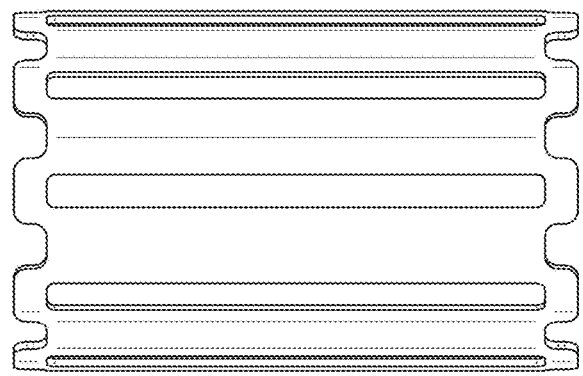
FIG. 19C is a top side view of the shroud, viewed from the top in the orientation shown in FIG. 19A, and identical to a bottom side view of the shroud viewed from the bottom in the orientation shown in FIG. 19A.

Thus with the correct combination of letter disks, the user can build any possible passphrase consisting of letters A-Z and spaces. The letter disks 1240 may be constructed from flat stainless steel sheets in the configuration depicted in FIG. 13A, and then formed into the hexagonal shape as shown in FIG. 13B-F by folding each letter tab 1244 along seam 1248 into a configuration that is perpendicular (within a reasonable degree of tolerance) to the plane of the central portion 1247 containing the hexagonal hole 1246. The characters 1242 may be marked on the tabs 1244 in any manner known in the art, preferably in a manner that is resistant to destruction by fire, chemicals, or aging, such as by debossing, embossing, etching, laser ablation, or the like. The configuration of the disks (and corresponding rods) for use in the system as shown and described in FIGS. 12A-12C are not limited to the configuration shown in FIGS. 13A-13F and described with respect thereto (and rods having a geometry for mating therewith). The disk/rod combination may conform to any configuration known in the art for rod to receive disks in a way that allows fixation of a portion of the disk in a selected one of a plurality of orientations, such as but not limited to any of the embodiments as described herein previously with respect to FIGS. 2-10.

Once the rods 1250 have been fashioned with the correct set of letter disks in the correct positions, they are then constrained via bolts 1216 between two endcaps 1210 (depicted in more detail in FIGS. 17A-17D), 1212 (depicted in more detail in FIGS. 18A-18D), with the addition of a windowed, protective shroud 1220 (depicted in more detail in FIGS. 19A-19D) over the outside of the letter disks, which obscures all of the faces except those aligning with the longitudinal windows 1222 to spell out the passphrase. The shroud 1220 may also have markings 1224 to indicate the sequence of the passphrase (e.g. numbers 1, 2, 3 . . . 10, as depicted). The markings 1224 may be formed in the shroud 1220 in any manner known in the art, preferably a manner that is resistant to destruction by fire, chemicals, or aging, such as by debossing, embossing, etching, laser ablation, or the like.

As depicted in FIGS. 12B and 12C, and in more detail in FIGS. 14B, 14C, 17D, and 18A, in some embodiments, each of the endcaps 1212 may have a hollowed area 1218 in its interior, which minimizes the overall weight of the device. Ledge 1402, as depicted in FIG. 14C as having a generally decagonal outline, is configured to provide a flat internal edge 1404 for receiving the flat external edges 1406 of hexagonal rods 1250 (only one of which is depicted in FIG. 14C, for illustration). This ensures that the flat faces of the rod 1250, and the corresponding flat faces of the disks mounted thereon, are presented tangentially to the outside of the device through the windows in the shroud for easy viewing. Thus, when the user tightens the bolts into the rods after loading the letters, the rod does not rotate unintentionally and thereby scramble or obscure the passphrase. The rod geometry and the internal hollowed geometry are not limited to any particular shape, however. The internal hollowed geometry preferably has (n) flats around the circle such that (n) is the number of rods available to load with letters, wherein n=10 in the embodiment depicted in FIGS. 12A-19D.

As depicted, the shroud 1220 interfaces with the endcaps 1210, 1212 along a sinuous line defined by a plurality of protrusions 1226 from the shroud alternating with protrusions 1214 from the endcaps 1210, 1212, with each protrusion 1226 from the shroud resting within a mating port 1215 disposed between protrusions 1214 in the endcaps. As illustrated in FIGS. 15A-D, each rod 1250 has a female threaded end 1252 (depicted in more detail in FIGS. 15A, D). As illustrated in FIGS. 16A-16D, the bolt 1216 defines the male threaded end 1217 of bolt 1216 (depicted in more detail in FIG. 16B). In some embodiments, the endcaps may have recesses (shown in FIGS. 14A, 17A, and 18D) for receiving the heads of the bolts (shown in FIG. 16A) to achieve a flat outer surface in the assembled configuration (shown in FIG. 12A).

The embodiment as depicted in FIGS. 12A-19D is depicted in additional detail in a U.S. Design patent application titled KIT FOR STORING AND DISPLAYING A STRING OF CHARACTERS, incorporated by reference herein and/or a complete copy of which is appended hereto as Appendix 1. Certain aspects of the design are depicted in Appendix 1 in dashed lines for the purposes of design protection, to indicate that the aspects so shown are not part of the design as claimed. It should be understood, however, that embodiments of the design may also be claimed in which additional aspects are depicted in dashed lines and not claimed or in which those depicted in dashed lines in the attached are depicted in solid lines and claimed, without limitation. Furthermore, but it should be understood that while the design patent coverage is intended to be drawn to certain aesthetic aspects of the particular embodiment depicted, equally functional embodiments may be of any design, as described in more detail herein. Those of skill in the art will recognize that certain aspects of the design, although having a particular geometry or contour, may be one of a plurality of geometries or contours that are equally functional for the purpose they serve. As one example, and without limitation, the mating tabs that define the interface of the end caps with the shroud may have any geometry and may be provided in any number, and the interface between the shroud and the end caps is not limited to a mating tab construction.

Once assembled, the device does not need to be disassembled for the lifetime of the usefulness of the passphrase. The device may be constructed of stainless steel or other equally robust materials designed to withstand house fires and other potentially destructive events.

Although particularly useful for storing a multi-word password, such as for use in cryptocurrency cold storage, the kits and method as described herein are not limited to any particular use. A user could simply wish to display a favorite saying or remember a single word or phrase that is unrelated to memorialization of a password. Although discussed herein with respect to providing a punctuation character in the nature of a space, other types of non-alphanumeric characters may also be provided. Although discussed and depicted herein in the context of the English language, it should be understood that the characters are not limited to alphanumeric characters, nor to alphanumeric characters of any particular language, and may include character sets corresponding to languages using the Latin alphabet or non-Latin alphabets (e.g. Japanese, Chinese, Korean, Arabic, Hebrew, Cyrillic, etc.) as well as non-language character sets, without limitation.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A kit for storing a string of characters, the kit comprising:
   at least one rod having a length and a non-round cross-sectional geometry;
   a plurality of disks, each disk having a hole defining a non-round geometry dimensioned to receive the at least one rod. each disk having an outer periphery and a plurality of characters visibly disposed on the outer periphery in each of a number of predetermined positions, each disk configured to receive the at least one rod in a plurality of orientations in which a selected one from the plurality of characters is non-rotatably oriented facing a predetermined radial direction;
   and means for securing a selected subset of one or more of the plurality of disks on the at least one rod;
   and wherein the at least one of rods are radially distributed about a longitudinal axis and attached to opposing endcaps at opposite ends of the rods, wherein each of the opposing endcaps has a hollowed area.

2. The kit of claim 1, wherein each disk has a plurality of peripheral outer faces, each peripheral outer face containing one of the plurality of characters.

3. The kit of claim 1, wherein each of the plurality of characters is embossed or debossed relative to at least an adjacent portion of the outer periphery of the disk.

4. The kit of claim 1, wherein the visibly disposed characters comprise alphanumeric characters and blank space characters.

5. The kit of claim 1, wherein the plurality of disks comprises a first plurality of disks each having a different character in each of the number of predetermined positions.

6. The kit of claim 1, wherein the number of predetermined positions on each disk is in a range of three to eight.

7. The kit of claim 1, wherein the cross-sectional geometry of the rod defines a first number of rotation-preventing features and the geometry of the holes in each disk define a second number of mating rotation-preventing features.

8. The kit of claim 1, wherein one or both of the at least one rod and the plurality of disks comprise a metal selected from the group consisting of:
   aluminum, steel, and tungsten and titanium.

9. The kit of claim 1, wherein one or both of the at least one rod and the plurality of disks comprise a ceramic material.

10. The kit of claim 1, wherein the length of the at least one rod is suitable and the plurality of disks are sufficient in number and character variety to permit an assembly of the plurality of disks on the at least one rod to store at least two words or word fragments, with a space between each pair of adjacent of the at least two words or word fragments.

11. The kit of claim 10, wherein the at least one rod is configured to hold a sufficient number of the plurality of disks to spell five to twenty-five of the at least two words or word fragments.

12. The kit of claim 10, wherein the at least one rod comprises a plurality of rods.

13. The kit of claim 12, further comprising a rack for receiving the plurality of rods each with an assembly of the plurality of disks mounted thereon.

14. The kit of claim 10, wherein some or all of the words or word fragments correspond to words selected from a set of seed phrase words that define a cryptocurrency wordlist.

15. The kit of claim 14, wherein the cryptocurrency wordlist comprises words each having a corresponding plurality of letters, wherein each word in the wordlist is uniquely identifiable by a corresponding word fragment having fewer than the corresponding plurality of letters.

16. A method of displaying a string of characters, the method comprising the steps of:
   a. providing the kit of claim 1; and
   b. assembling selected disks from the plurality of disks mounted on the at least one rod to form a string of the plurality of characters.

17. The method for claim 16, wherein displaying the string of characters comprises a memorialization of a security code, wherein the security code comprising a plurality of words or word fragments in sequence, the method further comprising assembling the selected disks on the at least one rod to spell the plurality of words or word fragments in the security code with a space between each pair of adjacent words or word fragments.

18. The kit of claim 1, wherein each of the opposing endcaps has a ledge including a flat internal edge for receiving respective flat external edges of the plurality of rods, such that the plurality of rods are non-rotatable relative to the shroud and the assembly of disks mounted the plurality of rods are non-rotatable relative to the plurality of rods.

19. The kit of claim 1, further comprising a shroud disposed between the endcaps, the shroud having a plurality of windows, each window aligned with one of the plurality of rods such that the characters oriented in the predetermined radial direction are visible through the window.

20. The kit of claim 19, wherein each of the opposing endcaps has a ledge including a flat internal edge for receiving respective flat external edges of the plurality of rods, thereby permitting the characters oriented in the predetermined radial direction to be visible through the window.

21. A kit for storing a string of characters, the kit comprising:
   at least one rod having a length and a non-round cross-sectional geometry, the at least one rod comprising a plurality of rods;
   a plurality of disks, each disk having a hole defining a non-round geometry dimensioned to receive the at least one rod, each disk having an outer periphery and a plurality of characters visibly disposed on the outer periphery in each of a number of predetermined positions, each disk configured to receive the at least one rod in a plurality of orientations in which a selected one of the characters is non-rotatably oriented facing a predetermined radial direction; and
   means for securing a selected subset of one or more of the plurality of disks on the at least one rod;
   a rack for receiving the one or more of rods each with an assembly of the plurality of disks mounted thereon; and
   wherein the length of the at least one rod is suitable and the plurality of disks are sufficient in number and character variety to permit the assembly of the plurality of disks on the at least one rod to store at least two words or word fragments, each word or word fragment comprising some of the plurality of characters, with a space between each pair of adjacent words or word fragments; and
   wherein the at least one of rods are radially distributed about a longitudinal axis and attached to opposing endcaps at opposite ends of the rods, the kit further comprising a shroud disposed between the endcaps, the shroud having a plurality of windows, each window aligned with one of the plurality of rods such that the characters oriented in the predetermined radial direction are visible through the window.

22. The kit of claim 21, wherein each disk has a central planar portion in which the hole is disposed, and a plurality of tabs bent at an angle perpendicular to the central planar portion, each tab comprising one of the characters.

23. The kit of claim 21, consisting of ten rods and five different disk configurations, wherein each disk has 6 tabs, including at least one disk configuration having an alphabetical character disposed on each tab, and one or more disk configurations having an alphabetical character disposed on each of five of the tabs and a blank space character disposed on one of the tabs.

* * * * *